United States Patent [19]
Cheng et al.

[11] Patent Number: 5,241,648
[45] Date of Patent: Aug. 31, 1993

[54] HYBRID TECHNIQUE FOR JOINING TABLES

[75] Inventors: Josephine M. Cheng, San Jose; Donald J. Haderle, Los Gatos, both of Calif.; Richard W. Hedges, Mississauga, Canada; Balakrishna R. Iyer, Fremont, Calif.; Chandrasekaran Mohan, San Jose, Calif.; Yun Wang, Sunnyvale, Calif.

[73] Assignee: International Business Machines Corporation, Armonk, N.Y.

[21] Appl. No.: 479,523

[22] Filed: Feb. 13, 1990

[51] Int. Cl.⁵ .............................................. G06F 15/40
[52] U.S. Cl. ................................. 395/600; 364/222.9; 364/282.1; 364/283.4; 364/DIG. 1
[58] Field of Search ... 364/200 MS File, 900 MS File; 395/600

[56] References Cited

U.S. PATENT DOCUMENTS

| | | | |
|---|---|---|---|
| 4,497,039 | 1/1985 | Kitakami et al. | 364/900 |
| 4,769,772 | 9/1988 | Dwyer | 364/300 |
| 4,779,192 | 10/1988 | Torii et al. | 364/200 |
| 4,811,207 | 3/1989 | Hikita et al. | 364/200 |
| 4,817,036 | 3/1989 | Millett et al. | 395/600 |
| 4,901,229 | 2/1990 | Tashiro et al. | 364/200 |
| 5,043,872 | 8/1991 | Cheng et al. | 395/600 |
| 5,121,494 | 6/1992 | Dias et al. | 395/600 |

OTHER PUBLICATIONS

Blasgen et al, "Storage and Access in Relational Data Bases", IBM Systems Journal, vol. 16, No. 4, 1977, pp. 363-377.
Valduriez et al, Join and Semijoin Algorithms for a Multiprocessor Database Machine, ACM Trans. on Database Systems, vol. 9, No. 1, Mar. 1984, pp. 133-161.
Valduriez, Join Indices, ACM Trans. on Database Systems, vol. 12, No. 2, Jun. 1987, pp. 218-246.
Kim, Won, "A New Way to Compute the Product and Join of Relations," University of Illinois, 1980 ACM, pp. 179-187.
Krieg, G. J., "Fast Table Joining in Relational Databases and Fast Row Retrieval," IBM TDB vol. 30 No. 2, Jul. 1987, pp. 750-757.
Pfister, G., "Parallel Equi-Join Algorithm for Large Relational Database Operations," IBM TDB vol. 30 No. 5, Oct. 1987, pp. 361-365.
Lohman, G. M., "Heuristic Method for Joining Relational Database Tables," IBM TDB vol. 30 No. 9, Feb. 1988, pp. 8-10.
Copenhaver, M. A. et al., "Interpretive Database Sort Algorithm," IBM TDB vol. 31 No. 3, Aug. 1988, pp. 124-126.
Chang, P. V., et al., "Interpretive Database Nested Loop Operation," IBM vol. 31 No. 3, Aug. 1988, pp. 143-145.

(List continued on next page.)

Primary Examiner—Gareth D. Shaw
Assistant Examiner—Dennis M. Butler
Attorney, Agent, or Firm—Baker, Maxham, Jester & Meador

[57] ABSTRACT

Results of a relational data base management system are joined in a process requiring, first, existence of an index on the join columns of the inner table, and, second, ordering on the join column of the first table. First, the index on the inner table's join column is scanned for rows of the inner table having join column values matching such values of rows in the outer table. This is done in a single pass through the outer table. Next, a temporary work table containing the identifiers of inner table rows having join column values matching those of the outer table is produced by concatenating the row identifiers to their matching outer table rows. Following this, the temporary work table is ordered by the identifiers. Last, the identifier list of inner table rows is used to retrieve the corresponding rows of the inner table. All predicates local to the inner table are applied to the retrieved rows, and those satisfying these local predicates are combined with their matching outer table rows and returned to the user.

5 Claims, 4 Drawing Sheets

OTHER PUBLICATIONS

Chang, P. V. et al., "Interpretive Database Merge Join Operation," IBM TDB vol. 31 No. 5, Oct. 1988, pp. 301–303.

Kitagami, Hajime et al., Translated Summary of Japanese Published Application No. 58-3031, "Join Operation Processing System of Relational Model," Aug. 1, 1983.

Kitagami, Hajime et al., Translated Summary of Japanese Published Application No. 58-3069, "Correlation Operation Executing and Processing System," Aug. 1, 1983.

Satou, Kazuhiro, Translated Summary of Japanese Published Application No. 59-117636, "Method and Device for Data Processing," Jul. 7, 1984.

Tezuka, Masayoshi et al., Translated Summary of Japanese Published Application No. 59-125461, "Outer Joining Operation System of Relational Data Base," Jul. 19, 1984.

Ishizuka, Tadatsugu, Translated Summary of Japanese Published Application No. 61-145661, "Assignment Management System of Main Storage Area," Jul. 3, 1986.

FIG. 1

SKILL-TABLE —10

| ROW | EMPNO | EMP-NAME | SKILL |
|---|---|---|---|
| 1 | 53 | FISHER | DESIGN |
| 2 | 207 | JONES | CODE |
| 3 | 100 | WEST | TEST |
| 4 | 7 | CHAN | TEST |
| 5 | 29 | PRESTON | TEST |
| 6 | 54 | McCOURT | DESIGN |
| 7 | 52 | DAVIS | DESIGN |
| 8 | 400 | PETERSON | CODE |
| 9 | 1 | SMITH | MANAGER |
| 10 | 18 | EDVARDS | MANAGER |
| 11 | 53 | FISHER | TEST |
| 12 | 207 | JONES | DESIGN |
| 13 | 7 | CHAN | CODE |
| 14 | 29 | PRESTON | DESIGN |
| 15 | 400 | PETERSON | TEST |

DEPT-TABLE —12

| EMPNO | MANAGER | DEPT |
|---|---|---|
| 53 | DAVIS | 17 |
| 207 | DAVIS | 17 |
| 400 | DAVIS | 17 |
| 7 | EDWARDS | 20 |
| 29 | EDWARDS | 20 |
| 54 | EDWARDS | 20 |
| 52 | SMITH | 17 |
| 100 | DAVIS | 17 |
| 1 | SMITH | 1 |
| 18 | SMITH | 20 |

SKILL-TABLE —10

| EMPNO | EMP-NAME | SKILL |
|---|---|---|
| 53 | FISHER | DESIGN |
| 207 | JONES | CODE |
| 100 | WEST | TEST |
| 7 | CHAN | TEST |
| 29 | PRESTON | TEST |
| 54 | McCOURT | DESIGN |
| 52 | DAVIS | DESIGN |
| 400 | PETERSON | CODE |
| 1 | SMITH | MANAGER |
| 18 | EDWARDS | MANAGER |
| 53 | FISHER | TEST |
| 207 | JONES | DESIGN |
| 7 | CHAN | CODE |
| 29 | PRESTON | DESISN |
| 400 | PETERSON | TEST |

—14

| EMP-NAME | MANAGER | SKILL |
|---|---|---|
| FISHER | DAVIS | TEST |
| PETERSON | DAVIS | TEST |
| WEST | DAVIS | TEST |

HYBRID TECHNIQUE FOR JOINING TABLES

BACKGROUND OF THE INVENTION

The invention is in the field of data base management and particularly concerns a hybrid technique for joining at least two tables of a relational data base management system. The technique is hybrid in that it combines positive features of two established methods for joining tables.

Figure 1:
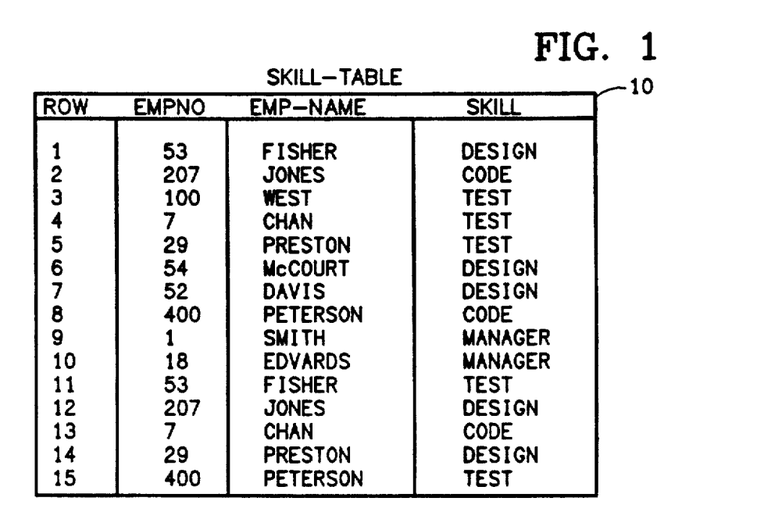
FIG. 1 illustrates a table stored in a relational data base management system.

In a relational data base system, data is stored in tabularized format. The tables of the data base consist of sets of rows which share common characteristics. For example, the Skill_Table structure of FIG. 1 is a table 10 in which are stored the records of all employees with particular production skills. Although the table implies that the records are in sequential order in contiguous storage, in fact, they may be stored randomly. However, for clarity of the discussion in this application and to emphasize the operation of the invention described below, tabularization will be illustrated as in FIG. 1.

In FIG. 1, each horizontal slice ("row") of the table contains three data fields, empno, emp_name, and skill. Thus, the first row in the table lists an employee whose employee number (empno) is 53, whose surname (emp_name) is Fisher, and whose production skill is listed as "design". Conventionally, the table is formatted by sequentially numbering the assembled rows so that, from top to bottom, the rows are identified by numbers ("identifiers"). In reality, the row identifier (RID) corresponds to an offset on a "page" of storage in which the table is contained.

"Join" is one of the most powerful operators in a relational data base system. The tool enables the user to assemble new tables out of existing tables according to criteria presented to the data base system in the form of a query. For example, in FIG. 2, it is asserted that the relational data base system which contains the Table 10 of FIG. 1 also contains a Table 12 which relates the employees listed in Table 10 with their direct managers and their departments ("dept"). A user of the system presents a query asking for all employees who possess the "test" skill and whose manager is DAVIS. The resulting table is indicated by reference numeral 14.

Figure 2:
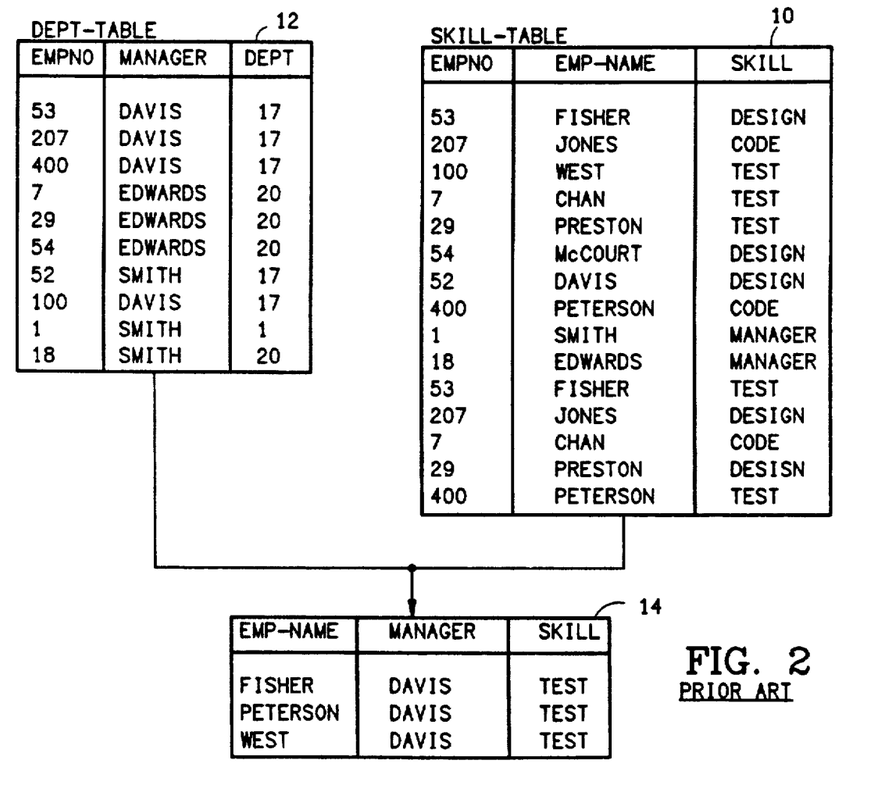
FIG. 2 illustrates prior art technique of joining two tables by the nested loop method.

When the tables are "joined", the rows of the resulting table 14 will contain the employee's name, manager, and skill, as illustrated in FIG. 2.

In deciding which records of the Tables 10 and 12 satisfy the predicates (i.e., conditions on values of columns), the contents of the tables are subjected to a structured examination. In this regard, the empno fields of the records are examined in a manner which treats the vertical alignment of these fields as a column. In each of the Tables 10 and 12, this column is referred to as a "join column". Thus, during the search, when the row with employee number 53 of the Table 12 is encountered and it satisfies the manager predicate, reference will be made to the empno column of Table 10 to discover the row or rows in that table for employee number 53. Once rows with identical join column values are located in Table 10, the skill condition is applied to the row in Table 10. Conditions like the latter one are referred to as "local" predicates, since they refer to only columns of a single table.

When two rows in Tables 10 and 12 are found which satisfy, first, the join predicate, and second, the respective local predicates, a new row including the desired join table fields is created from these two records and entered into the join Table 14.

Many techniques are known in the prior art for implementing, in one way or another, a join method which will combine rows of two or more tables into a join table. The assignee of this patent application, for example, provides the following data base products, each of which supports one or more join methods: DB2, SQL/DS, AS/400 Data Base Manager, and OS/2 Extended Edition Data Base Manager.

A representative syntax used for one or more of these products in stating the query given above is expressed as follows in SQL:

SELECT emp_name, manager, skill
 FROM dept_table, skill_table
 WHERE dept_table.empno = skill_table.empno
  and dept_table.manager = "Davis"
  and skill_table.skill = "test"

This query joins the Tables 10 and 12 for all rows whose empno values are equal. The condition on the empno field is called a "join predicate". The columns of the Tables 10 and 12 referred to in the join predicates are the "join" columns of the tables. The predicates manager = "Davis" and skill = "test" are called "local predicates".

This example is not meant to be limiting. In other words, the prior art data base systems support queries which have more than one join predicate and more than one local predicate for each table. Also, plural predicates can be combined using conventional AND operators and OR operators, or a combination of operators. Furthermore, any number of fields can be retrieved for rows which satisfy join predicates to construct the resulting rows. Join may involve more than two tables.

Two specific prior art join procedures are known; each has particular strengths which make it particularly efficient for certain conditions, and each has limitations which make it expensive for other conditions. The two techniques are termed "nested loop join" and "sort-/merge join".

Refer to FIG. 2 for an understanding of the prior art nested loop join technique. In FIG. 2 (and in the following Figures), the dept_table structure 12 is termed the "outer" table, while the skill_table structure 10 is the "inner" table. In the nested loop join technique, for each row in the outer table 12 that satisfies the local predicate or predicates, the join column or columns in the inner table are scanned for matching rows. Thus, the join column of the outer table is scanned from top to bottom to locate rows satisfying the predicate that the employee's manager be Davis. For each row in the outer table in which Davis is denoted as the manager, the join column of the inner table 10 is scanned from top to bottom if an index does not exist. During the scan, each inner table row whose join column value matches that of the outer table's row is subjected to the test of whether its skill condition is equal to test. In the nested loop scan, therefore, two nested scans are employed, the first, a scan of the outer table for rows which satisfy the local condition; then, for each of these rows, a complete join column scan of the inner Table 10 or a probe via an index on the join column is made to find matching records.

Figure 3:
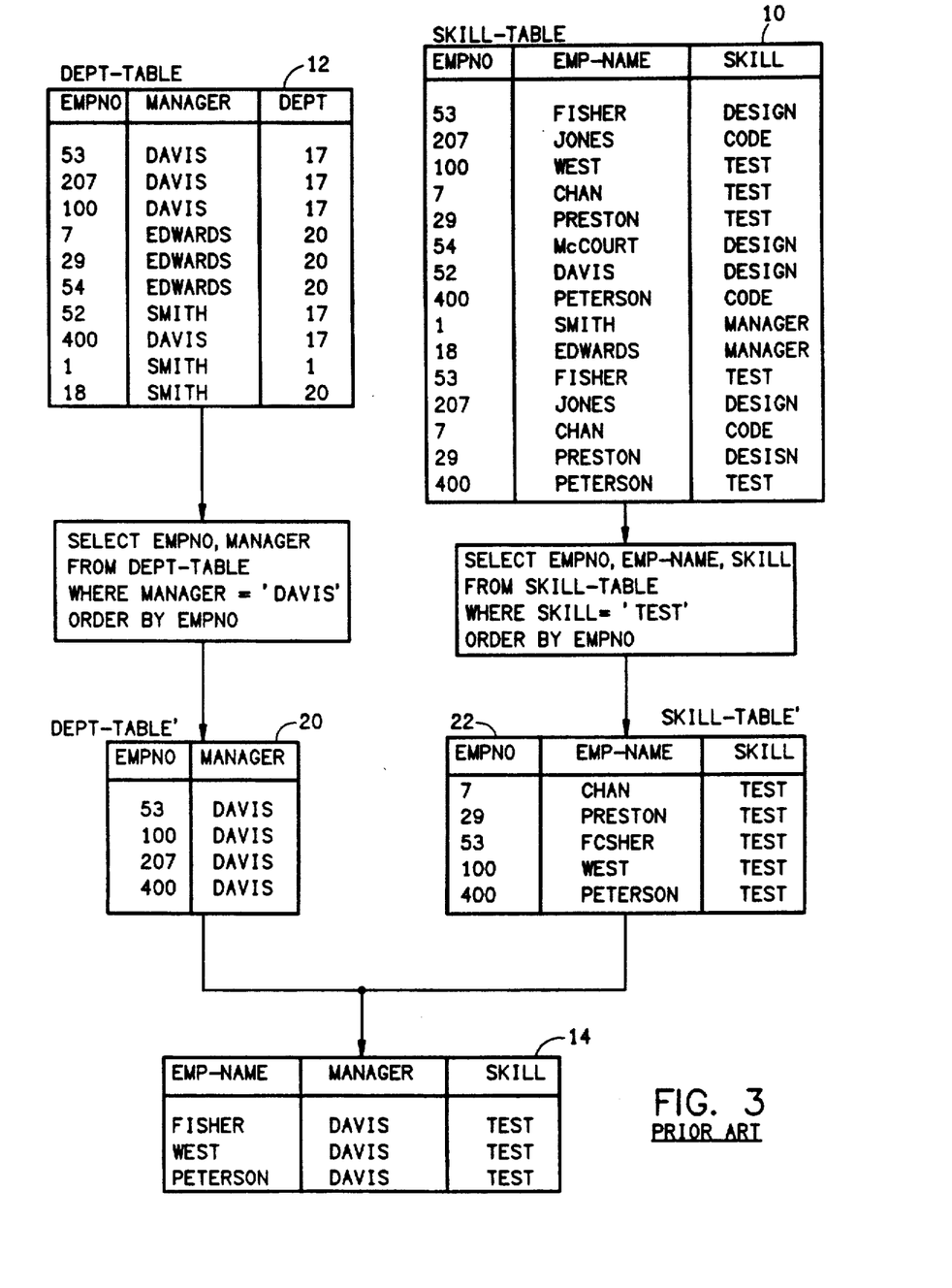
FIG. 3 illustrates the prior art technique of joining two tables by the sort/merge method.

The sort/merge join of the prior art is illustrated in FIG. 3. A pre-condition of this technique is that the outer and inner tables be ordered based upon their join columns, which enables the join to be done similarly to the MERGE phase of a SORT routine. Relatedly, a table can be ordered by sorting, or reached through an index to provide access in join column sequence. Local predicates on each table are applied before a sort, as illustrated in FIG. 3. Thus, the Table 20 is built from the Table 12 by sorting the manager 32 Davis rows in order by employee number magnitude. Similarly, a sorted Table 22 is derived from the skill Table 10 by selecting skill table records having "test" in their skill fields and ordering those records by employee number. Once join column order is imposed on the tables, the join is done very efficiently using the join column sorted structures. Thus, the join begins by scanning the join column of the Table 22 with the employee number 53, corresponding to the first entry in the derived Table 20. When a match is encountered, a join table row is assembled from the matching rows and entered into the joined Table 14. Following this, the next record in the Table 20 is obtained and the scan of the join column of the Table 22 is picked up from where the last scan stopped. In this manner, the join columns of the sorted Tables 20 and 22 are each scanned only once in effecting the join of the tables. In comparison, the nested loop join procedure requires that the inner table join column be scanned entirely each time an outer table row is found satisfying the outer table local predicate or predicates.

The nested loop join technique makes efficient use of an index on the join column of the inner table. The nested loop join technique is good when the join column values passed to the inner table are in sequence and the join column index of the inner table is clustered, and when the number of rows retrieved in the inner table by finding matching values in the index is small. As is known, an index is clustered when the rows of the table are, for the most part, stored in the same physical sequence as the sequence of key values.

The drawbacks of the nested loop join are manifold. First, for each row in the outer table, the join column value of the outer table is passed as the key to the index of the inner table. When a match is found to the index key, the join procedure is suspended and an I/O procedure is dispatched to fetch the data page corresponding to the index key if the data page is not already in the memory of the system. Suspension of the join process to dispatch the I/O process makes the two "synchronous". Synchronous I/O is undertaken even for a clustered index access on the inner table, because the join column values of the outer table may not be in sequence, or there may be a large gap between outer table join column values. As is known, a synchronous I/O process takes longer than an asynchronous I/O process which accumulates page numbers and fetches them in bulk or which prefetches pages.

The second drawback of the nested loop join arises when the inner table is accessed through an index tree. In this case, the join column value of each row of the inner table is searched through the index tree starting from the root, and continuing to the leaf page for the matching key value. This mode of access is referred to as a random "index probe". When the join column values of the outer table are far apart, the index probe is efficient. When the join column values are spaced closely, index scan through leaf pages is more efficient. However, in this case, the nested loop join does not make use of the information gained from the previous row processing.

Last, in the nested loop join, rows with duplicate join column values in the outer table may be accessed randomly, as when access is keyed on the field containing the local predicate of the outer table. Therefore, duplicate rows in the outer table require the same amount of CPU processing time as that for the first of the duplicate rows and may require fetching the data page of the inner table again, if it is not in memory.

The disadvantage of the sort/merge join lies in its failure to make effective use of the join column index for filtering. In this technique, rows that do not participate in the join result may also be sorted resulting in spending unnecessary CPU and I/O time in accessing rows that will be filtered out by the join predicates later on.

The inventors have determined that the performance differential between nested loop and sort/merge joins can vary by an order of magnitude or more. The implication is that the cost of incorrectly choosing a join method is very high. Yet, today's data base systems frequently choose the join method which may be significantly more expensive at execution time, due to insufficient or incorrect statistics or correlated column values across tables.

There is a need for an alternative to the two primary prior art join methods which will circumvent their disadvantages, while at the same time maintaining advantages of both methods.

SUMMARY OF THE INVENTION

The invention consists of a hybrid join technique which fully utilizes an index on the join columns and local predicates of the outer and inner tables, while providing sequential access to data pages with efficient duplicate processing and effective index retrieval. The hybrid join technique of this invention enhances the performance of both the nested loop join method and the sort/merge join method. The hybrid join technique is better than either of the prior art techniques for a wide range of applications. The hybrid join technique of this invention provides a safe technique whenever a data base system is in a doubtful situation.

The hybrid join technique of this invention joins two tables of relational data base management systems in a three-stage process. Initially, it is asserted that any system in which the invention is practiced requires an index to exist on one or more of the join columns of the inner table when the join predicates are combined by ANDing or that indexes on each join column of the inner table exist where index ANDing or ORing can be performed to achieve the result of an index on all join columns.

Stated formally, these pre-conditions are as follows:

1. If the join predicates are in the form of ($P_1$ AND $P_2$ AND ... $P_n$) then the invention requires an index exists on one or more join columns of the inner table where $P_i$, i=1, ..., n is the join predicate involving one column of each table;

2. If the join predicates are in the form of ($P_1$ OR $P_2$ OR ... $P_n$) then the invention requires that enough indexes be provided so that all the join columns of the inner table are represented (individually or collectively) in these indexes; and 3. If the join predicates are compound predicates which combine conjunctive (AND) and disjunctive (OR) forms as provided in the first and second conditions, then the first and second conditions must hold for the corresponding forms.

In the first stage of the process of the invention, the index on the inner table's join column is scanned for rows of the inner table having join column values matching such values of rows in the outer table. This is done in response to a single pass through the outer table, which is ordered (by sorting, scanning an index on the join column of the outer table, or scanning a table via a clustered index) on the join column, and through the inner table's index on the join column (which is inherently ordered). At the end of this stage, a temporary work table containing the selected inner table RID's concatenated to their matching outer table rows is produced.

In the second stage, the temporary work table is ordered by RID, if not already in such order, or nearly so.

Last, the RID list of inner table rows is used to fetch the selected rows of the inner table. The local predicates and join predicate are applied to these rows, and those satisfying both are combined with their matching table rows and returned for placement in the join table.

A very unique property of this invention is the ability to gain access to data in its physical order, which supports highly efficient I/O. In supporting access to data in its physical order, the invention also enables parallel execution of data accessing tasks through data partitioning. Further, the invention can be practiced by running parallel tasks on separate processors, each executing a different step of the method, one step feeding (pipelining) results into the next step.

A primary object of this invention is to provide a join technique which uses existing data base structures to enhance nested loop and sort/merge join techniques. Another object of this invention is to enable multiple processes to process data in parallel or in a pipeline, thereby reducing response time. The achievement of this objective and other significant objectives and advantages will be appreciated when the following detailed description is read in conjunction with the below-described drawings.

DESCRIPTION OF THE PREFERRED EMBODIMENT

Preliminarily, it is asserted that the technique to be described is executable on a programmed computer system including a relational data base management system of SQL type, or equivalent. SQL type systems are embodied in products of the assignee of this application, such as the DB2 and SQL/DS Data Base Management Systems. Both products can be executed on a system of the IBM System/370 type, or equivalent machines. Specifically, DB2 is intended for use with MVS/370 and MVS/XA Operating Systems, while the SQL/DS Data Base Management System is intended for use with the VM/SP, VM XA System Product, VSE/SP and VSE operating systems. A data base manager of the SQL type is provided by the assignee of this invention in connection with OS/2 EE product and AS/400 product. In addition, a user interface with an underlying SQL type system is provided by a user query product, such as the QMF facility available from the IBM Corporation. Such a facility can also provide query-based user interface to a relational data base by way of the invention of this application.

THE INVENTION

Figure 4:
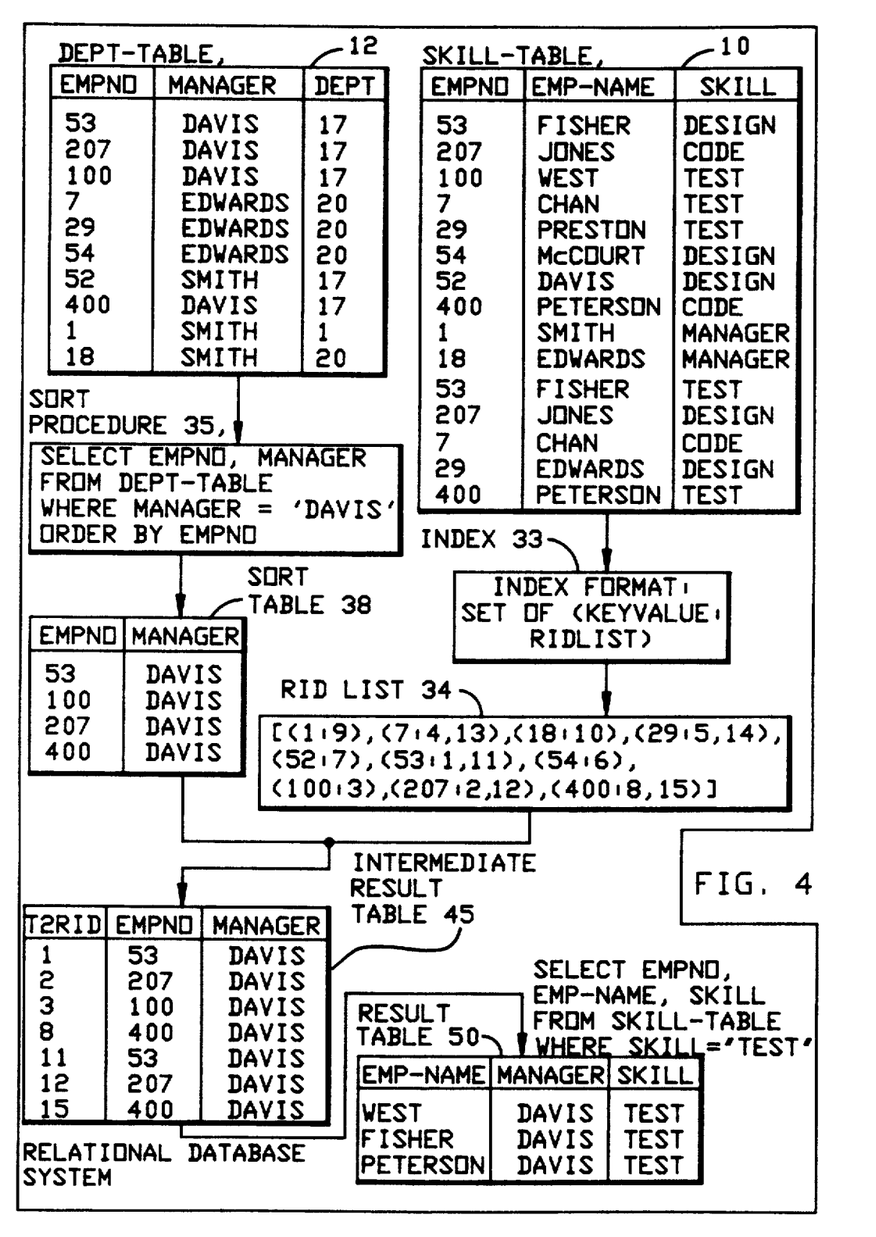
FIG. 4 illustrates the hybrid join technique of the invention.

The hybrid join technique of this invention is illustrated in Tables I, II, and III, which are explained with reference to an example join of the Tables 10 and 12. The example is illustrated in FIG. 4. The tables indicate the three phases of the technique of this invention. The three tables are presented in the form of pseudo-code which assumes an underlying SQL type system. In the pseudo code, the outer table (table 12) is referred to as "T1", while the inner table (table 10) is referred to as "T2". As is known, an SQL system employs constructs called "cursors" to obtain sequential access to data base records. In this regard, a cursor is defined by the SELECT statement of a query. In SQL programming, an OPEN statement is employed to begin execution of the cursor declared by the SELECT statement. The cursor is applied to the data base structures designated in the FROM clause of the query. The OPEN statement accesses the designated structures, obtaining designated fields of records satisfying the join and local conditions. Conventionally, OPEN cursor processing proceeds recursively until all of the designated structures have been completely accessed. The OPEN procedure assembles a set of intermediate results which are used to retrieve records during the FETCH phase of cursor processing.

The FETCH statement in SQL processing obtains the records based upon the intermediate results and constructs a join table comprising the fields designated in the SELECT statement.

Last, the CLOSE statement deactivates a cursor and any associated processes.

Referring now to Table I and FIG. 4, the first phase of the technique of the invention is invoked when a cursor is opened in a relational database system of the SQL type. During the first phase, an intermediate result table is built, the table being used at FETCH time to provide the outer table (Table 12) row and the row identifier (RID) of its matching row in the inner table (Table 10). First, a scan providing sorted access to the Table 12 is opened in statement 100. Generically, "scan" refers to a process of record search in which table records are examined sequentially, row by row. In statement 101, a scan is opened on the join column of the inner table, Table 10 in FIG. 3.

TABLE I

| | OPEN CURSOR PROCESSING |
|---|---|
| 100 | Open a scan providing sorted (or mostly sorted) access to T1. |
| 101 | Open a scan on the T2 index. |
| 102 | Do Until (EOF on T1 \| EOF on T2) |
| 103 | Get the next T1 row, retrieving all needed columns & applying all available predicates. |
| 104 | If the new key value is not a duplicate, Then |
| 105 | Fetch a RID list from T2, where index key = join column value. |
| 105a | Else use the previous RID list if found |
| 106 | If a RID list was found, Then |
| 107 | Build the composite rows (T2 RID, T1 data) in the intermediate result table. |
| 107a | Send to sort the intermediate result table on T2 RID. |
| 108 | End. |
| 120 | Merge all the runs resulted from sort. |

TABLE I-continued
OPEN CURSOR PROCESSING

| | |
|---|---|
| 121 | If indexes on columns of local predicates (T2) are used, Then |
| 122 | Build a sorted RID list for qualifying rows. |
| 123 | "AND" the RIDs with those in the intermediate result table. |
| 125 | If EOF (on either T1 or T2), Then |
| 126 | Close the scan on T1. |
| 127 | Close the scan on the T2 index. |
| 130 | Open a sequential prefetch scan on T2. |
| 131 | Open a sequential prefetch scan on the intermediate result table. |

TABLE II
FETCH CURSOR PROCESSING

| | |
|---|---|
| 200 | Do until (row-returned \| EOF). |
| 201 | Fetch the next row in the intermediate result table. |
| 202 | If the T2 RID is the same as the last one, Then |
| 203 | Reuse the same inner table row |
| 204 | If the row satisfies all predicates, Then |
| 205 | Build the result row & return it to the user. Indicate row-returned. |
| 206 | Else |
| 206a | Else |
| 207 | Fetch the T2 row, applying all predicates (including join predicates). |
| 208 | If (the row satisfies all predicates), Then |
| 209 | Build the result row & return it to the user. |
| 210 | Indicate row-returned. |
| 211 | End. |

TABLE III

Close cursor processing
If scan on T2 is open, Then
Close it.
If scan on intermediate result table is open, then
Close it The scan on the index of the Table 10 is discussed in greater detail below. This scan progresses sequentially through the index on the join column of the Table 10 to retrieve the RID's of the rows satisfying the join predicate in the Table 10. The scan's results can be understood with reference to FIG. 4. If the index has the form of, for example, a tree, its outermost (lowest) members, called "leaves" contain the RID's of the Table 10 rows in an index format having the form (key value: RID list). Since the scan is keying on the join column of Table 10, the key value is the value of the join column of an outer table row, while the parameter "RID list" is a list which identifies table rows which have that key value.

The procedure 35 in FIG. 4 sorts the rows of Table 12 by the local predicate (manager="Davis") and orders the corresponding records by their join column values. The outcome of the process is represented by the Table 38.

Returning to the open cursor process of Table I, a DO loop is opened in step 102 which is continued until the end of file (EOF) indicators are encountered in Table 12. In the procedure, for each of the rows in the outer table, Table 12, which satisfies the predicates which are local to the outer table, the RID list 34 is obtained from the index on the Table 10 for the set where the key value is equal to the join column value of the Table 12 row. The exception is when the join column value of the Table 12 row duplicates one previously processed.

Assuming that the join column value of the currently-accessed Table 12 row matches an index key in the index 33 on Table 10, a composite row (consisting of a subset of columns of the outer table and the RID of the inner table) is built in steps 106 and 107. (The subset includes all columns needed to execute the query.) As the composite row is produced, it can be sent to be sorted on the T2's RID column, step 107a. In a multiple-processes (or tasks) environment, one process can produce the composite rows and send them for sorting, while another process can consume the rows and perform sorting. All sorted runs are merged in step 120. The composite rows form an intermediate result table which has the form indicated by reference numeral 45 in FIG. 4; the table is ordered on the RID values retrieved from the index 33 on Table 10.

In steps 121 through 123, provision is made for reducing the size of the intermediate result Table 45 in the event that one or more indexes exist on columns referenced in predicates local to Table 10. It is noted that step 106 and 107 provide for building more than one composite record if the RID list 34 includes more than one value. This is illustrated, for example, by the index set (53:1, 11), which lists two row locations in Table 10 for records having employee number 53. Assuming that an index exists on the predicate which is local to Table 10, that is, skill="test", the local predicate index is employed in steps 121-123 to build the sorted list 34 of RID's whose corresponding records "qualify" by satisfying the local predicate. Non-qualifying RID's are not listed. The sorted RID list 34 is then ANDed with the intermediate result table 45 to enter the list of qualified RID's into the table. In this case, step 120 can be done with step 123, i.e., the "anding" is done at the same time the "merging" of all the sorted runs is performed. In steps 125-127, the procedure closes the scans on the Tables 10 and 12.

Finally, sequential prefetch scans are opened on the inner table, and the intermediate result Table 45 in steps 130 and 131. These scans are required for the next phase of processing during which the qualified rows from the inner table are fetched and combined with the corresponding rows of the outer table to form the join table.

One unique property of this invention is the provision of access to table data in its physical order, which supports efficient I/O. Since the invention accesses table data in its physical order it also provides an opportunity for parallel execution through data partitioning. Assuming that parallel tasks are accessing the table data, when each parallel task works on its part of the data which is physically clustered together, the I/O contention can be reduced to a minimum. When a query is I/O bound, each parallel executing task can access table data through a respective I/O device.

When a query is CPU bound, it would be desirable to run each of the parallel executing tasks on its individual processor to fully exploit the CPU power. Because the invention accesses table data in its physical order, each parallel task can perform its own I/O in large quantity through, for example, a prefetch facility, which not only increases the I/O efficiency, but also reduces any possible I/O contention among different parallel tasks.

In addition, to exploit parallelism through data partitioning, more parallelism of access of tables and indexes may be achieved in the following manner. Simultaneously, during the access on the outer table, sorted runs may be formed by exploiting a tournament tree. The sorted runs may be written to temporary tables.

Next, the temporary tables containing the sorted runs may be accessed for merging, while the index on the join column is simultaneously accessed. The rows from the merged runs are combined with the RIDs from the index. Simultaneously, runs formed by introducing the row, RID combination to a tournament tree that sorts by RIDs, will form runs which can be written into temporary tables. Last, these temporary tables may be accessed and merged, with the inner table being accessed concurrently.

In order to reduce the response time further by exploiting CPU parallelism, the previously outlined steps can be executed in parallel by using multiple processes or tasks. A process executing a step passes the results of its step, as the result is produced, to the process executing the next step. In this manner, the steps form a pipeline.

Refer now to Table II and to FIG. 4 for an understanding of the second stage of processing according to the invention. The second stage is invoked when the FETCH is issued. During this phase, the intermediate result Table 45 is accessed and the corresponding inner table row is retrieved and returned to the user.

The FETCH processing of Table II is done repetitively, the loop being opened in step 200 and closed in step 211. In the loop, the intermediate result table scan and sequential prefetch scan of steps 131 and 130, respectively, are employed to sequentially prefetch the rows of the intermediate result Table 45 and to sequentially access the corresponding rows of the inner Table 10. Thus, in step 201, the next row of Table 45 is fetched. If the RID of the fetched row is identical with RID of the previously fetched row, the same inner table row is reused. Otherwise, the corresponding inner table row is retrieved from the set of sequentially prefetched inner table rows and all the predicates are evaluated for it. If the row satisfies the predicates, the result row is built as specified by the SELECT statement of the query. Result rows are built and returned in this manner until all entries of the intermediate result table have been accessed, at which time the FETCH processing ends. The CLOSE processing of Table III closes any scans that are still open and ends the processing according to the invention.

EXAMPLE OF OPERATION

The example of FIG. 4 illustrates the invention described above and embodied in Tables I-III. One principal precondition of the invention is that the outer table be ordered by sorting or indexing on the join predicates or table space scan with a well-clustered index on the join column. In FIG. 4, this is satisfied by the process 35 which effectively scans the outer Table 12, subjecting it first to the test of the local predicate. All rows of the Table 12 whose manager columns match the indicated value "Davis" are ordered by employee number as indicated in the Table 38. It is asserted that the invention is not limited to ordering the outer table by the procedure of reference numeral 35. As is known, if an index exists on one or more of the join columns of the outer table, ordering is implicit in the index.

The invention also presupposes ordering of the inner table by indexing on its join columns. Again, indexing implies ordering and supports sequential access to the rows of the table if the RIDs are ordered.

Thus, using the rows of the outer Table 12, ordered and sorted by the join column, the invention takes, as an index key value, the employee number of the first record, which is 53. This key value is used to scan the index 33 of Table 10. In this regard, the scan on the index 33 of Table 10 starts at the set (1:9) and scans from there down to the set (53:1,11). The list 1,11 is fetched from the set and two composite rows are built and placed in the Table 45. When placed in the table, the rows are ordered, so that the first row is that denoted by the RID value of 1 and the second by the RID value 11. The process returns to the next outer table row in the structure 38, and changes the key value to 100. The key value is passed to the index scan which moves sequentially from the key value set where it last stopped and moves to set (100:3). The composite row is constructed, placed in order in table 45 between rows 1 and 11, and the outer table scan moves to row 207. This procedure continues until the EOF on the Table 38 or the EOF on the index is encountered.

As a row in the intermediate result table is formed, it can be sent for being sorted on the RIDs of the inner table. Merging of all the sorted runs can be performed on the results in Table 45 of FIG. 4. The I/O processing necessary to retrieve the inner table rows to do the fetch step can be accomplished in a single, asynchronous step by passing to a buffer manager the list of RID's in the table 45 and then accessing the retrieved inner table rows, one-by-one after the I/O is completed. The retrieved inner table rows are taken in the order of the intermediate results table 45. In this case, the first two entries in the table fail the application of the local predicate "test" since the first row of the skill table denotes "design", while the second denotes "code". However, the third entry in the table 45 corresponding to row 3 of the inner table 10 meets the local predicate. Consequently, the FETCH process builds the result row West/Davis/test and returns it to the user. Similarly, the second and third entries in the result Table 50 correspond to inner table rows which satisfy the local predicate. Since the local predicate of Table 12 has already been applied to the outer table records, the manager field of the result records all contain the entry "Davis".

INNER TABLE INDEX SCAN

Figure 5:
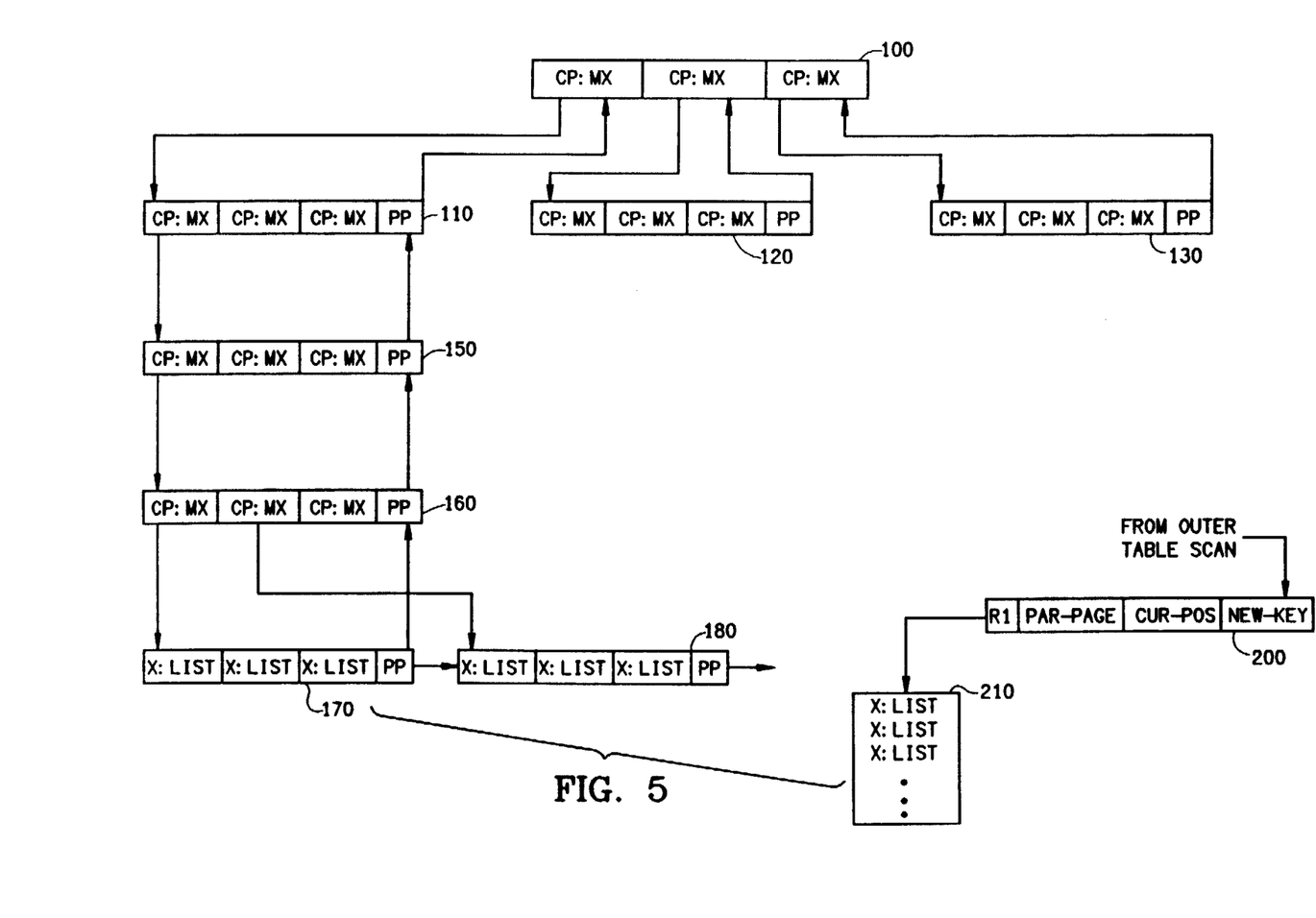
FIG. 5 illustrates an index tree structured with parent pointers.

A method for efficiently scanning an inner table index keyed to an inner table join column is illustrated in FIG. 5 and Table IV. The index scan supports a fast forward (or backward) movement to a leaf page with a specific higher (lower) key value given that a position is currently held on a preceding (succeeding) page with a particular lower (higher) key value by using the technique of Table IV.

For an understanding of Table IV, refer to FIG. 5 which illustrates a portion of an index tree which is keyed to an inner table join column. The tree structure has a root node 100 which maintains pointer sets for each of its children. A pointer set consists of (CP:MX) in which CP is a child pointer pointing to a respective child of the node and MX is the maximum value indexed through that child. Underneath the parent node 100 is a first level of child nodes 110, 120, and 130. The child nodes are structured identically with the root node 100 with the addition that each maintains a parent pointer PP pointing to the parent node. The tree of FIG. 5 is incomplete in that it does not show all of the children of the parent nodes 110, 120, and 130. However, a portion of the tree, a "subtree", stemming from the parent node 110 is illustrated by nodes 150 and 160. The nodes 150 and 160 are representative of lower levels of the index tree. The leaves of the tree are indicated by the structures 170 and 180, each of which consists of linked data sets of the form (key value:list). In the example of FIG. 4, the sets are those consisting of the emp-no and list of RID's. Each leaf also contains a parent pointer PP, as well as a pointer to the next leaf in sequence. Thus, the leaf 170 has a pointer to the leaf 180, and so on. A data structure 200 is maintained by the index scan and includes the fields PAR_PAGE, CUR_POS and NEW_KEY. The NEW_KEY field contains the current key value passed from the outer table scan initiated in step 100 of Table I. The structure 200 is maintained by the scan on the inner table index which is opened in statement 101 of Table I. The CUR_POS field is the current position of the index scan in an index leaf in the tree of FIG. 5. The PAR_PAGE field includes the PP pointer to the parent page of the current position.

In operation, the scan illustrated in Table IV compares the NEW_KEY value most recently received from the outer table scan with the range of index values contained in the leaf where the scan is currently positioned. If the new key belongs on the leaf, then the list attached to the key value is looked up and placed in a temporary buffer. If the new key is not on the page where the scan is currently positioned, the scan moves up the tree, following the parent pointer of the leaf to the parent node. At the parent node, the new key value is compared against the child pointer fields of the parent node to determine whether its value lies in the range represented by any of the other children in the subtree off of the parent node. If the new key is within the range of one of the other children of the parent node, the scan follows the child pointer down to the indicated leaf and retrieves the RID list. Otherwise, the scan follows the parent pointer of the non-leaf node upwardly until it locates the subtree wherein the new key value is contained. The accumulated set 210 of RID lists can be passed asynchronously for I/O processing at a point appropriate in the overall execution of the invention described herein.

TABLE IV par_page - pointer to parent page
cur_pos - current position in index leaf page
new_key - the next key to be looked up
if new_key belongs on page (cur_pos)
then look it up
else move to parent of page (cur_pos) by following par_page pointer (and recurrently if necessary) to identify
subtree in which new_key belongs
on reaching root of sutree in which new_key belongs
start climbing down the tree and reach the leaf where
the new key belongs The described invention is practiced preferrably in the form of a programmed computer having conventional components such as a multi-processing or multi-tasking CPU, main memory, and auxiliary memory in the form of, for example, a magnetic tape. The invention would be embedded into such a system through, for example, a magnetic tape bearing an object code representation of a database management program ("data base manager") including functions of this invention which are illustrated in Tables I, II, III and IV. Such a program would be initially written to a magnetic storage means such as a magnetic tape through a high-level intermediary in the form of a computer program written in a programming language such as PL-1.

While we have described several preferred embodiments of our invention, it should be understood that modifications and adaptations thereof will occur to persons skilled in the art. Therefore, the protection afforded our invention should only be limited in accordance with the scope of the following claims.

We claim:

1. A machine-executed method for joining first and second tables of a relational database system, the system including an index on a join column of the second table, the method comprising the relational database system-performed steps of:
   (a) comparing the rows of the first table with a local predicate;
   (b) retrieving rows of the first table which satisfy the local predicate and entering the rows into a sort table;
   (c) ordering the rows of the sort table by join column values;
   (d) retrieving, from the index, identifiers of rows of the second table having join column values satisfying a join predicate and entering the identifiers in a row index (RID) list;
   (e) retrieving, from the second table, rows matching the identifiers of step (d); and
   (f) combining the rows of the sort table with the rows retrieved in step (e) to produce composite rows and entering the composite rows in an intermediate result table.

2. The method of claim 1, wherein step (f) includes: (f1) comparing the rows of step (e) with a local predicate; and (f2) combining the sort table rows of step (c) only those rows of step (e) which satisfy the local predicate.

3. The method of claim 1, wherein further including the following steps performed after step (d) and prior to step (e):
   combining the identifiers retrieved from the index with fields of respective matching sort table rows to produce intermediate rows; and
   ordering the intermediate rows by the identifiers in an intermediate table.

4. The method of claim 1, wherein the index includes an index tree, the index tree including a plurality of nodes, certain nodes of the plurality of nodes being children of other nodes in the plurality of nodes, certain of the children being leaves, wherein in step (c) includes:
   (c1) maintaining in each child node in the tree a pointer to the child node's parent;
   (c2) maintaining in each node a set of data structures, each data structure including a pointer to a child of the node and a maximum identifier value contained in a leaf of a subtree reached through the child;
   (c3) locating the leaf containing the lowest identifier value of a set of identifier values and recording the values;
   (c4) if a next higher identifier value of the set of identifier values is not on the leaf, following the parent pointer from the leaf to the node containing a child pointer to a node which is the root of a subtree containing the next higher identifier value;
   (c5) following child pointers from the node of step (c4) to the leaf containing the next higher identifier value in recording the value; and
   (c6) recursively performing steps (c4) and (c5) until all values in the set of identifier values have been recorded.

5. A machine-executable method for joining first and second tables in a relational database system, the system providing a prefetch facility and including an index on a join column of the second table, comprising the relational database system-performed steps of:

(a) retrieving rows of the first table which satisfy a first local predicate and placing the rows into a sort table in an order determined by join column values;

(b) identifying rows in the second table having join column values matching join column values of the rows of the sort table of step (a);

(c) obtaining from the index row identifiers of the second table rows identified in step (b), each row identifier including a value which identifies a respective row of the second table;

(d) combining the identifiers obtained in step (c) with sort table rows to form intermediate rows and placing the intermediate rows in an intermediate result table, wherein each intermediate row includes a row identifier of a row of the second table, a join column value matching the corresponding join column value of the second table row identified by the row identifier and the corresponding join column value of a row of the sort table, and a value corresponding to the first local predicate;

(e) if the row identifiers are not in order, ordering the intermediate rows by row identifier values;

(f) retrieving from the second table rows matching the row identifiers of step (e) in the prefetch facility;

(g) combining second table rows retrieved in step (f) and satisfying a second local predicate with intermediate rows to form result rows, each result row including a join column value of a second table row and a join column value of an intermediate row including the row identifier of the second table row; and (h) placing the result rows in a result table.

* * * * *